Dec. 27, 1955  R. K. ILER  2,728,740
PROCESS FOR BONDING POLYMER TO SILICEOUS SOLID OF
HIGH SPECIFIC SURFACE AREA AND PRODUCT
Filed Nov. 9, 1951
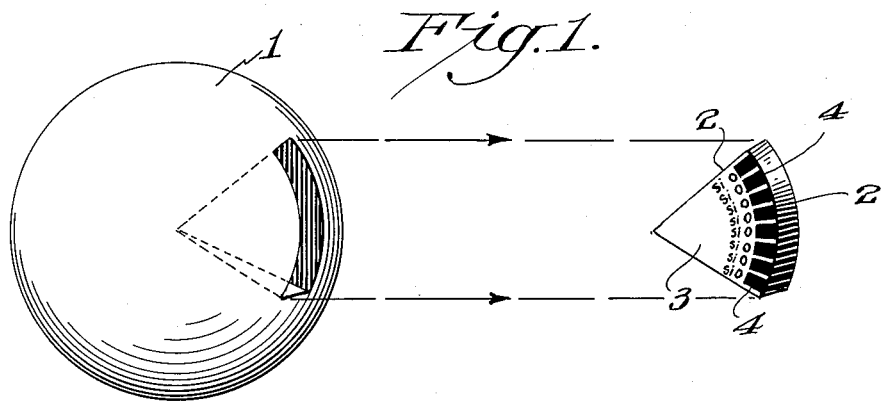
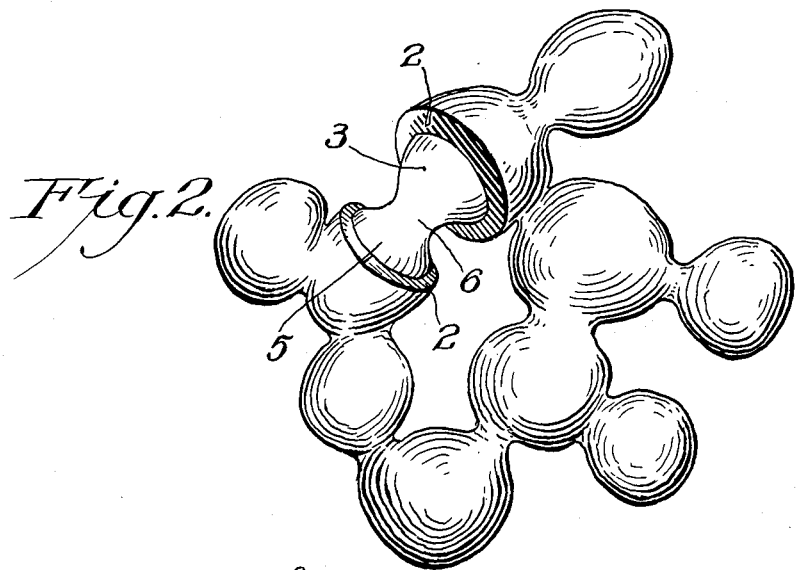
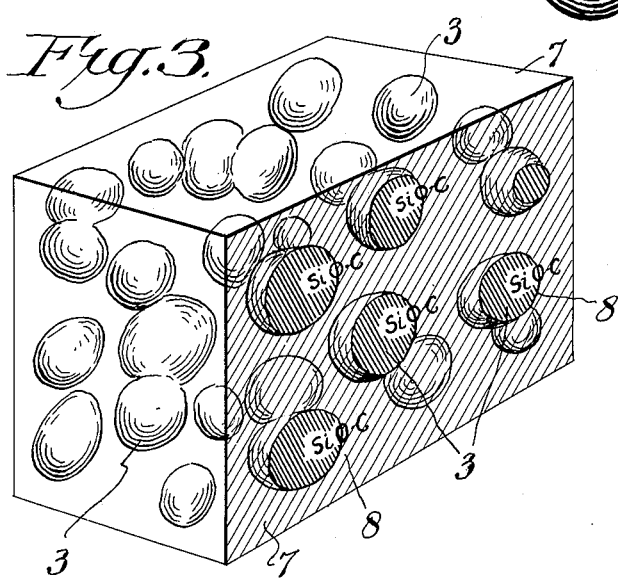
INVENTOR:
Ralph K. Iler
BY Albert B. Griggs &
Fred C. Carlson
ATTORNEYS

United States Patent Office 2,728,740
Patented Dec. 27, 1955

2,728,740

PROCESS FOR BONDING POLYMER TO SILICEOUS SOLID OF HIGH SPECIFIC SURFACE AREA AND PRODUCT

Ralph K. Iler, Wilmington, Del., assignor to E. I. du Pont de Nemours and Company, Wilmington, Del., a corporation of Delaware Application November 9, 1951, Serial No. 255,674

6 Claims. (Cl. 260—41)

This invention relates to polymers of ethylenically-unsaturated compounds which contain or are coated upon an inorganic siliceous solid which is chemically bonded to the polymer through a siloxy oxygen linkage. The invention is further directed to processes in which such products are prepared by effecting the polymerization of an ethylenically-unsaturated compound in contact with an inorganic siliceous solid which carries unsaturated ester groups upon its surface.

This application is a continuation-in-part of my United States application Serial No. 171,759, filed July 1, 1950, and of my United States application Serial No. 171,760, filed July 1, 1950, both now abandoned.

In the drawings Figure 1 illustrates in perspective a particle of a product produced according to the invention with a section exploded out to show greater detail, and Figure 2 is a similar view of a product of the invention showing an aggregate of a plurality of particles with a portion of the coating material cut away, and Figure 3 illustrates a modification of the invention in which the particles are dispersed and embedded in the polymeric material.

Describing products of the invention in somewhat greater detail and referring to the drawings, there is shown in Figure 1 a spherical particle 1. This particle has a coating 2 composed of a polymer of an ethylenically-unsaturated compound.

In products of the invention the polymer is chemically bonded to an inorganic siliceous solid 3 through a siloxy oxygen linkage. The siloxy oxygen linkage is illustrated in the exploded section of Figure 1 by the oxygen lying between the silicon atom and the organic polymer, illustrated as is conventional by the symbol Si-O-, and the molecules of the organic polymer 4 are illustrated with a heavy black line.

Thus in the exploded section it will be seen that the organic polymer molecules lie uniformly over the surface of the siliceous solid and are linked thereto through the siloxy oxygen to the silicon atoms located at the boundary of the siliceous solid.

In products of the invention as will be further described hereinafter the inorganic siliceous solid can assume the form of finely divided powders, in which event the sphere of Figure 1 may be typical of the particles. The solid, however, may be in the form of an aggregate composed of a plurality of siliceous particles bonded together at junction points to form a comparatively rigid 3-dimensional network. Typical of such products, of course, are gels.

In Figure 2 there is illustrated an aggregate according to the invention. The siliceous substrate of Figure 2 is illustrated at 3. It will be seen that a particle 3 is joined to a like particle 5 at a neck 6. It will be understood that the remainder of a 3-dimensional network of the siliceous material is formed in similar manner.

Upon the network of the siliceous material there is chemically bonded a polymer of an ethylenically-unsaturated compound 2. This coating is formed by a chemical bonding through siloxy oxygen linkages as illustrated fully in Figure 1 but obviously not susceptible to detailed illustration in Figure 2.

In products of the invention the ratio of the organic polymer to the siliceous material may increase until the siliceous material is enclosed within, and in effect embedded within, the polymer. An aggregate structure such as that of Figure 2 may be embedded in such a polymer mass, or individual particles such as those of Figure 1 may be dispersed in a polymer mass as is more fully illustrated in Figure 3.

In Figure 3 silica particles 3 are uniformly dispersed through the mass of a polymer 7. The polymer 7 is chemically bonded to the inorganic siliceous solid particles 3 through siloxy oxygen linkages after the manner of the illustration in Figure 1. In Figure 3 the siloxy linkage is illustrated in the section shown on the face in elevation by typical groups 8. It will be understood, of course, that the surfaces of the particles 3 are covered uniformly with such siloxy linkages.

Referring to the drawings generally it should be noted in passing that no effort is made to make the scale even approximately correct in regard to the relative sizes of the silicon or oxygen atoms or organic polymer molecules, as compared to the size of the siliceous particles. It will be, of course, understood that the siliceous particles are so large compared to the atoms and molecules mentioned that there may be several thousand atoms, for instance, at the boundary of each siliceous particle.

Products of the invention can be prepared by processes generally which comprise polymerizing an ethylenically-unsaturated compound in contact with an inorganic siliceous solid which carries upon its surface unsaturated ester groups. In other words, the inorganic siliceous surface should have chemically bound thereto —OR, where R is an unsaturated hydrocarbon radical, wherein the carbon atom attached to oxygen is also attached to at least one hydrogen atom. It is preferred that each —OR group have from 2 to 18 carbon atoms.

The processes of the invention may be carried out generally, then, by treating the siliceous solid with an unsaturated alcohol under such conditions as to effect esterification. Then the same alcohol, which is an ethylenically-unsaturated compound, can be polymerized to form a chemical bond with the modified siliceous material. Alternatively, the modified siliceous material can be introduced into a different ethylenically-unsaturated compound which is to be polymerized or which has been partially polymerized to produce products as described. In either event it will be seen that an ethylenically-unsaturated compound will be polymerized in the presence of an inorganic siliceous solid which carries upon its surface unsaturated ester groups. Thus the siliceous solids esterified with unsaturated alcohols may be subsequently treated so as to result in copolymerization of the unsaturated —OR groups on the siliceous solid with active unsaturated linkages in the polymerizing organic polymer.

It will be understood that in order to produce products of the invention as described it is important both that the solid siliceous substrate receive a surface coating of unsaturated ester groups and that the polymer illustrated be a polymer of an ethylenically-unsaturated compound. These conditions are necessary so that there will be obtained the chemical bonding through a siloxy oxygen as previously discussed, whereby the resulting polymer is linked through oxygen to the substrate.

From the foregoing description it will be understood that products of the invention prepared as herein described are not to be confused with materials in which siliceous solids are covered or coated with physically adsorbed films of resinous polymers. For example, such materials may be obtained by merely milling a siliceous solid into a paint composition or plastic composition, or by immersing the solid in a solution of an inorganic polymer which is thereafter left as a film upon the siliceous substrate by evaporating the solvent.

THE SILICEOUS SUBSTRATE

Siliceous substrates suitable for use according to the present invention are fully described in my co-pending applications, above-mentioned, of which the present application is a continuation-in-part. The disclosure of those applications is herewith incorporated by reference.

The siliceous materials used in this invention for the internal structures or skeletons of the products of the invention are solids. These siliceous solids may be amorphous silica or they may be water-insoluble metal silicates coated with amorphous silica. In any event the substrates must have surface silanol groups (SiOH) and preferably their surfaces are substantially covered with silanol groups. These materials are inorganic and contain substantially no chemically-bound organic groups.

The siliceous substrates may be of different sizes and shapes. They may for example be gels, finely divided powders, fibrous materials, plate-like materials, and so forth.

It is preferred to use a siliceous substrate; and a silica substrate which has a specific surface area greater than 25 square meters per gram is still better.

Typical of materials suitable as substrates are acid-treated minerals such as attapulgite clay, chrysotile asbestos, and bentonite. There may also be used synthetic zeolites which have been treated with sufficient acid to produce a silica surface. Glass fibers of extremely small diameter which have been acid-treated are also suitable. Silica gels, aerogels and precipitated silicas can similarly be used.

It is belived unnecessary to repeat here the extensive disclosure of suitable substrates in my U. S. co-pending applications as previously described but any of those there named may likewise be used for the purposes of the present invention.

THE UNSATURATED-ESTER COATING

The formation of an ester coating upon a siliceous substrate can be effected using the processes as described in my co-pending U. S. applications, above designated, in which a siliceous material is heated with an unsaturated alcohol. The surface-esterified siliceous products thus obtained are hereinafter sometimes referred to as estersils.

Any of the unsaturated alcohols described in my above-cited U. S. applications may be used. These alcohols have the formula ROH, where R is an unsaturated hydrocarbon radical, wherein the carbon atom attached to oxygen is also attached to at least one hydrogen atom, each —OR group having from 2 to 18 carbon atoms.

Illustrative of suitable ethylenically unsaturated alcohols are allyl alcohol, allyl (2-propene-1-ol), crotyl (2-butene-1-ol), oleyl (cis-9-octadecen-1-ol), citronellol [3,7-dimethyl-6 (or 7)-octen-1-ol], and geraniol (3,7-dimethyl-2,6-octadien-1-ol).

To effect esterification of a siliceous substrate with an unsaturated alcohol the substrate is heated with an excess of alcohol under dehydrating conditions. A temperature above about 100° C. is preferably used and the amount of water must be less than 5 per cent and is preferably less than 1 per cent in the system.

While complete coverage of the surface of the siliceous solid with ester groups is preferred it is not essential. However, at least one bromine-reactive unsaturated ester group should be present in the unsaturated-ester coating for each square millimicron of surface area of the surface-esterified siliceous solid. By bromine-reactive is meant unsaturated groups which will react with bromine, adding two bromine atoms for each ethylenic unsaturated group. Under the conditions conventionally employed for the determination of bromine number, having the bromine number which gives the amount of bromine absorbed per unit weight of the surface-esterified siliceous solid, and having determined the specific surface area of the siliceous solid by the nitrogen adsorption method, it will be obvious to one skilled in the art how to calculate the number of bromine-reactive ethylenic groups per square millimicron of surface area.

The details of the formation of the ester coating also are set out in my prior applications of which the present case is a continuation-in-part and no need is seen here for giving the conditions in any great detail. For further information on the conditions, reference may be had to the prior applications.

THE ETHYLENIC POLYMERIZATION

The polymerization of the ethylenically-unsaturated compound is well understood by those skilled in the art and no extensive description of conditions is necessary. The monomers which may be employed in preparing the products of this invention are the polymerizable organic compounds which have ethylenic double bonds which provide aliphatic carbon-to-carbon unsaturation and which are recognized as being capable of undergoing addition polymerization across the double bond in the presence of a compound capable of yielding reactive free radicals under the conditions of the reaction.

Examples of such compounds are ethylene, propylene, the butylenes, vinyl fluoride, vinylidene fluoride, trifluoroethylene, tetrafluoroethylene, vinyl chloride, vinylidene chloride, vinyl acetate, vinyl trimethylacetate, vinyl methyl ketone, vinyl propyl ketone, styrene, acrylonitrile, methacrylonitrile, acrylic acid, methacrylic acid, methylacrylate, ethyl methacrylate, cyclohexyl acrylate, bornyl methacrylate, allyl acrylate, acrylamide, methacrylamide, diallyl succinate, diallyl phthalate, maleic and fumaric esters, methyl hydrogen maleate, dimethyl maleate, diethyl fumarate, maleic anhydride, butadiene, isoprene, chloroprene and copolymers of two or more of the above.

A preferred type of ethylenically-unsaturated material for use according to the present invention is a mixture of styrene and butadiene, which is the basis for synthetic rubbers, and mixtures of styrene with viscous esters of methacrylic acid, which are widely used in laminating resins.

It will of course be understood that in addition to the ethylenically-unsaturated compounds just above-named, one may employ any of the unsaturated alcohols previously described as suitable for forming the ester coating. These will be especially useful for the production of coatings which are relatively thin such as those illustrated in Figures 1 and 2 of the drawings. The polymers obtained by the polymerization of unsaturated alcohols with the unsaturated ester groups on the silica substrate tends to yield polymers which are of relatively low molecular weight. On the other hand, ethylenically-unsaturated hydrocarbon materials such as styrene polymerize much more readily and rapidly and form polymer chains of high molecular weight upon the substrate of siliceous solids.

The exact conditions for preparing the products of this invention depend upon the nature of the polymerizable monomer. If the monomer is normally a liquid the products may be made in open reactors fitted with means for keeping the monomer from being lost through volatilization. If the monomer is normally a gas, then a closed reactor is employed and the reaction is conducted under autogenous pressure. If desired, however, externally applied pressure can be used to accelerate the reaction bringing about more complete utilization of monomer, or to effect some other beneficial result.

The polymer may be formed in the liquid phase with the siliceous solid which has unsaturated surface ester groups in suspension. In this event products similar to those shown in Figure 3 will be produced. On the other hand, small amounts of catalysts may be deposited upon the surface of siliceous aggregates similar to those shown in Figure 2 and the ethylenically-unsaturated compound may then be brought into contact with the solid in the form of a gas. Alternatively, rather thin coatings may be applied by diluting the ethylenically-unsaturated compound with a suitable inert solvent. The esterified silica is then introduced into the solution and polymerization is then effected. In this case a certain amount of polymer may be formed from the unsaturated compound which will not be chemically bound to the silica surface, but this may be removed from the bound polymer by extraction of the product or with suitable solvents.

Generally the polymerization is conducted at temperatures in the range from 40 to 150° C. However, the best results from the standpoint of polymer quality, reaction rate, and monomer utilization are obtained within the range from 60 to 100° C. This is therefore the preferred operating temperature range. The time of reaction is a variable function and depends upon the nature of the monomer being polymerized, the temperature and pressure conditions employed. As a rule the polymerization is carried on until there has been appreciable utilization of the monomer, for example, at least ten per cent of the monomer present.

In order to effect the polymerization the catalysts customarily used in the art should be employed. There may be used benzoyl peroxide, tertiary butyl hydroperoxide, diethyl peroxide, cumene hydro-peroxide, or azonitriles such as azo-bis-isobutyronitrile.

As an alternative to the above catalysts which are of the free-radical type, the polymerization may be effected in the absence of added catalysts by the application of heat and pressure.

Again it is unnecessary to give any great detail on the use of catalysts, temperatures, and pressures because the polymerization of these ethylenically-unsaturated compounds either alone or in mixtures is generally well understood.

It will be understood in accordance with the descriptions previously given that in processes of the present invention a siliceous substrate may be treated with an unsaturated alcohol to form an unsaturated-ester coating. After the coating has formed, or simultaneously with the formation of the coating, heating is continued and a polymerization catalyst added if desired. Further quantities of the unsaturated alcohol are also preferably added, although all that is to be used may be present at the beginning. In this way the ethylenically-unsaturated alcohol reacts with the unsaturated groups in the ester coating to form a coating such as that illustrated in Figure 1 at reference numeral 4.

Instead of using in the polymerization the alcohol previously employed in forming the unsaturated-ester coating, one may instead use another alcohol or another ethylenically-unsaturated compound or mixtures of such. These may be introduced while the esterification reaction is in progress or thereafter.

Generally, the siliceous solid carrying unsaturated ester groups upon its surface is formed in situ or is added at some point before completion of the polymerization of the ethylenically-unsaturated compound with which it is to be reacted.

The weight ratio of the siliceous solid material to the ethylenically-unsaturated compounds may vary widely depending upon the character of the product to be produced. If a very thin coating is to be provided as illustrated in Figures 1 or 2, a coating consisting of only a few ethylenically-unsaturated monomer units will suffice. For example, the weight ratio is not only dependent upon the thickness of the coating but upon the specific surface area of the siliceous substrate. In general it is preferred to have a sufficient number of ethylenically-unsaturated units applied to the silica surface to provide a polymer coating having a thickness greater than about 3 millimicrons. This will correspond to the groups 4 in Figure 1 having about 20 or more carbon atoms in a chain.

At the other extreme the ratio of polymer to siliceous solid may be quite large, so that after the polymerization, the siliceous solid is chemically bonded into a mass of the polymer as a suspension or solid dispersion. This is illustrated, for instance, in Figure 3 of the drawings.

Finely divided products made according to the invention may be used as rubber fillers, thickeners for lubricating greases, as water repellent-buoyant material for life jackets, thermal insulation, and for various other uses in which organophilic or hydrophobic products of high surface area and finely divided conditions are desired. It will be evident that the polymer masses of the types described in Figure 3 may be used in formed articles such as plastic shapes, extruded fibers or filaments and sheets. Glass fibers which have been coated with a polymer according to the invention are rendered more resistant to chemical attack by water and dilute alkali and are made more resistant to abrasion.

In order that the invention may be better understood the following specific illustrative examples are given in addition to those already generally described.

*Example 1*

A silica sol was prepared in the following manner: A solution of sodium silicate, having an $SiO_2:Na_2O$ mole ratio of 3.36, and containing 3.64 grams of $SiO_2$ per 100 milliliters, was heated to 95° C. To ten volumes of this hot silicate solution 1 volume of a 2.9 N sulfuric acid solution was added over a period of one-half hour, at a uniform rate, and with vigorous agitation. The final $SiO_2$ concentration was 3.3% and 80% of the $Na_2O$ originally present in the sodium silicate solution was neutralized, i. e., the final $SO_3:Na_2O$ mole ratio was equal to 0.8. The $Na^+$ ion concentration was maintained at less than 0.4 N throughout the process and the final pH of the sol was about 10. In this manner an opalescent silica sol was prepared, the particles of which were about 15 millimicrons in diameter as determined from electron micrographs. Hereafter, a silica sol prepared in the above manner will be referred to as the "heel."

To a "heel" prepared in this manner equal volumes of sodium silicate solution ($SiO_2:Na_2O$ mole ratio=3.36) and a sulfuric acid solution were added simultaneously but separately with vigorous agitation over a two-hour period, while the temperature was maintained at 95° C. The concentration of the sodium silicate solution was about 6.6 grams of $SiO_2$ per 100 milliliters and a sufficient volume was added over the two-hour period so that two parts of $SiO_2$ were added for each part of $SiO_2$ originally present in the "heel." The concentration of $SiO_2$ in the silica sol or slurry was maintained at 3.3 grams of $SiO_2$ per 100 milliliters throughout the preparation. The concentration of the sulfuric acid (0.52 N) was adjusted so that at all times the ratio of $SO_3$ to $Na_2O$ in the solution was 0.8, i. e., a pH of about 10 was maintained. The $Na^+$ ion concentration was maintained at less than 0.4 N throughout the process. Early in the "build-up" process the particles of silica present in the heel started to coalesce and precipitate. The final slurry was filtered, the wet filter cake was reslurried in water, and coagulated with 0.2% by weight (based on $SiO_2$) of a mixture of equi-molar portions of cetyl and lauryl trimethylammonium bromide. The pH was adjusted to about 8 with 4 molar sulfuric acid, the reslurry was filtered, washed, and the cake was dried and the soft, pulverable product was powdered in the Raymond mill.

The dry powder consisted of coherent aggregates of coalesced ultimate dense units having an average unit diameter of 25 millimicrons as measured from electron micrographs and a specific surface area $S_c=94$ $M^2/g$. as calculated therefrom. The specific surface area as measured by nitrogen adsorption ($S_n$) was 97 $M^2/g$. and the specific hydroxylated surface area was 97 $M^2/g$. as measured by methyl red adsorption. Thus the coalescence factor $S_c/S_n$ was 0.97. A slurry of 4 grams of the silica in 40 cc. of distilled water had a pH of 8.2. The following results were obtained upon chemical analysis: 89.54% $SiO_2$, 0.23% carbon, 1.20% sodium, 4.92% $H_2O$ by Fischer titration, 2.26% non-siliceous ash, and 8.25% loss on ignition. The bulk density of the dry powder was 0.160 g./cc. at 3 p. s. i.; 0.239 g./cc. at 78 p. s. i.; and 0.492 g./cc. at 1560 p. s. i. above atmospheric pressure.

Ten grams of a precipitated silica in the form of coherent aggregates of coalesced ultimate units having 30 millimicrons average unit diameters prepared according to the method outlined above and having a specific hydroxylated surface area of 83 $M^2/g$. was suspended in 200 cc. of dicyclopentenyl alcohol and was heated for one hour at 250° C. in a one liter stainless steel autoclave.

The esterified product was filtered, washed with methyl ethyl ketone twice and dried at 75° C. in vacuum for 48 hours. The esterified product was an organophilic, hydrophobic white powder. The specific hydroxylated surface area as determined by methyl red dye adsorption was zero.

The product as thus prepared and having an unsaturated-ester coating can then be used advantageously as a filler for partially polymerized organic compounds. For example, amounts ranging from 10 to 30 per cent can simply be added to styrene and the styrene polymerized in the conventional manner. For example, a suitable catalyst is 1 per cent by weight of benzoyl peroxide based on the weight of the styrene, the polymerization being conducted at a temperature initially held at 60° C. and finally raised to 100° C. after the initial rapid polymerization has subsided. These polymerization conditions are all in accordance with conventional prior art practices. The usual precaution of effecting the polymerization in the substantial absence of oxygen should be observed by evacuating the reaction vessel.

*Example 2*

Twenty-five grams of a dry silica powder prepared according to the method of Example 1 were slurried in 300 cc. of allyl alcohol and heated in an autoclave to 205° C. While the temperature was maintained at this point, the autoclave was vented to permit the alcohol to escape as a vapor. The product remaining in the bomb was dried at 75° C. in vacuum and was organophilic. The product had the following chemical analysis: $SiO_2$ 76.05%; loss on ignition 18.02%; non-siliceous ash 5.93%; carbon 8.12%; hydrogen 1.55%; bromine consumption 5.87 grams bromine per 100 grams of product. The specific hydroxylated surface area as calculated from the adsorption of methyl red dye was 8 $M^2/g$. Since each unsaturated group will take two bromine atoms, these data permit the calculation of unsaturated groups per unit surface area. This calculation gives 252 unsaturated groups per 100 square millimicrons of surface area of the internal structure.

The products obtained according to the present example have a coating of a polymer of an ethylenically-unsaturated compound and this coating has a thickness of the order of about 3 millimicrons. If it is desired to obtain still thicker coatings by this method the polymerization should be continued as by adding additional quantities of allyl alcohol and heating for a longer period. It will also be evident that the product can further be modified at this point by polymerization with other ethylenically-unsaturated compounds such as styrene, all as previously generally described above.

While in the above examples a finely divided silica powder has been used it will be understood that the same techniques may be used in preparing products of the invention using a silica gel, an acid-treated siliceous mineral such as asbestos, or any of the materials above described.

I claim:

1. In a process for making a polymer which contains an inorganic solid the steps comprising polymerizing an ethylenically-unsaturated compound in the presence of a solid material introduced before polymerization is complete, said solid material consisting of an inorganic solid substrate surface-coated with —OR groups, the substrate having a surface of silica and having a specific surface area of at least one square meter per gram, the coating of —OR groups being attached by chemical reaction to said silica through —Si—O—C— bonds, R being a bromine-reactive, ethylinically-unsaturated hydrocarbon radical of 2 to 18 carbon atoms, wherein the carbon atom attached to oxygen is also attached to hydrogen, and there being at least one R radical for each square millimicron of surface-coated solid.

2. In a process for making a polymer which contains an inorganic solid the steps comprising polymerizing an ethylenically-unsaturated compound in the presence of a solid material introduced before polymerization is complete, said solid material consisting of an inorganic solid substrate surface-coated with —OR groups, the substrate having a surface of silica and having a specific surface area of at least 25 square meters per gram, the coating of —OR groups being attached by chemical reaction to said silica, through —Si—O—C— bonds, R being a bromine-reactive, ethylenically-unsaturated hydrocarbon radical of 2 to 18 carbon atoms, wherein the carbon atom attached to oxygen is also attached to hydrogen, and there being at least one R radical for each square millimicron of surface-coated solid.

3. A composition comprising a polymer and an inorganic solid, the composition being produced by polymerizing an ethylenically-unsaturated compound in the presence of a solid material introduced before polymerization is complete, said solid material consisting of an inorganic solid sulstrate surface-coated with —OR groups, the substrate having a surface of silica and having a specific surface area of at least one square meter per gram, the coating of —OR groups being attached by chemical reaction to said silica through —Si—O—C— bonds, R being a bromine-reactive, ethylenically-unsaturated hydrocarbon radical of 2 to 18 carbon atoms, wherein the carbon atom attached to oxygen is also attached to hydrogen, and there being at least one R radical for each square millimicron of surface-coated solid.

4. A composition comprising a polymer and an inorganic solid, the composition being produced by polymerizing an ethylenically-unsaturated compound in the presence of a solid material introduced before polymerization is complete, said solid material consisting of an inorganic solid substrate surface-coated with —OR groups, the substrate having a surface of silica and having a specific surface area of at least 25 square meters per gram, the coating of —OR groups being attached by chemical reaction to said silica through —Si—O—C— bonds, R being a bromine-reactive, ethylenically-unsaturated hydrocarbon radical of 2 to 18 carbon atoms, wherein the carbon atom attached to oxygen is also attached to hydrogen, and there being at least one R radical for each square millimicron of surface-coated solid.

5. A composition comprising a polymer and an inorganic solid, the composition being produced by polymerizing an ethylenically-unsaturated compound in the presence of a solid material introduced before polymerization is complete, said solid material consisting of an inorganic solid substrate surface-coated with —OR groups, the substrate being amorphous silica and having a specific surface area of at least 25 square meters per gram, the coating of —OR groups being attached by chemical reaction to said silica through —Si—O—C— bonds, R being a bromine-reactive, ethylenically-unsaturated hydrocarbon radical of 2 to 18 carbon atoms, wherein the carbon atom attached to oxygen is also attached to hydrogen, and there being at least one R radical for each square millimicron of surface-coated solid.

6. A composition comprising a polymer as a coating enclosing a solid material, the composition being produced by polymerizing an ethylenically-unsaturated compound in the presence of a solid material introduced as a base for coating by the polymer before polymerization is complete, said solid material consisting of an inorganic solid substrate surface-coated with —OR groups, the substrate having a surface of silica and having a specific surface area of at least one square meter per gram, the coating of —OR groups being attached by chemical reaction to said silica through —Si—O—C— bonds, R being a bromine-reactive, ethylenically-unsaturated hydrocarbon radical of 2 to 18 carbon atoms, wherein the carbon atom attached to oxygen is also attached to hydrogen, and there being at least one R radical for each square millimicron of surface-coated solid.

References Cited in the file of this patent

UNITED STATES PATENTS

| | | |
|---|---|---|
| 2,185,586 | Brooks | Jan. 2, 1940 |
| 2,278,231 | Wright | Mar. 31, 1942 |
| 2,306,222 | Patnode | Dec. 22, 1942 |
| 2,395,550 | Iler et al. | Feb. 26, 1946 |
| 2,395,880 | Kirk | Mar. 5, 1946 |
| 2,438,520 | Robie et al. | Mar. 30, 1948 |
| 2,467,340 | Seymour | Apr. 12, 1949 |
| 2,513,268 | Steinman | June 27, 1950 |